March 27, 1945.　　G. W. SWANSON　　2,372,403
TRACTOR CULTIVATOR
Filed June 15, 1942　　2 Sheets-Sheet 1

INVENTOR
GEORGE W. SWANSON
BY
ATTORNEY

March 27, 1945.  G. W. SWANSON  2,372,403
TRACTOR CULTIVATOR
Filed June 15, 1942  2 Sheets-Sheet 2

INVENTOR
GEORGE W. SWANSON
BY
ATTORNEY

Patented Mar. 27, 1945

2,372,403

UNITED STATES PATENT OFFICE 2,372,403

TRACTOR CULTIVATOR

George W. Swanson, Denver, Colo.

Application June 15, 1942, Serial No. 447,048

4 Claims. (Cl. 97—47)

This invention relates to crop-cultivating attachments adapted to be operatively secured to and carried by conventional tractor units, and has an object to provide an improved operative association of such cultivator attachments with a tractor.

A further object of the invention is to provide an improved mounting for the removable and replaceable association of cultivator attachments with a tractor.

A further object of the invention is to provide improved means for operatively associating a two-row cultivator assembly removably and replaceably on a tractor.

A further object of the invention is to provide improved means for the selective altitudinal adjustment of cultivator attachments carried by a tractor.

A further object of the invention is to provide improved means for positioning and holding a cultivator gang in substantially parallel relation with the surface to be cultivated throughout its range of altitudinal adjustment.

A further object of the invention is to provide an improved combination of cultivator and ditcher attachments in removable and replaceable operative relation with a tractor for either alternative or simultaneous adjustment to operative position.

A further object of the invention is to provide improved means for mounting and actuating a plurality of cultivator gangs in operative association with a tractor so as to permit convenient adjustment in the spacing between an operative range of said gangs to fit the needs of varying field and crop conditions.

My invention consists in the construction, arrangement, and combination of elements as hereinafter set forth, pointed out in my claims, and illustrated by the accompanying drawings, in which—

Figures 1, 2, 4:
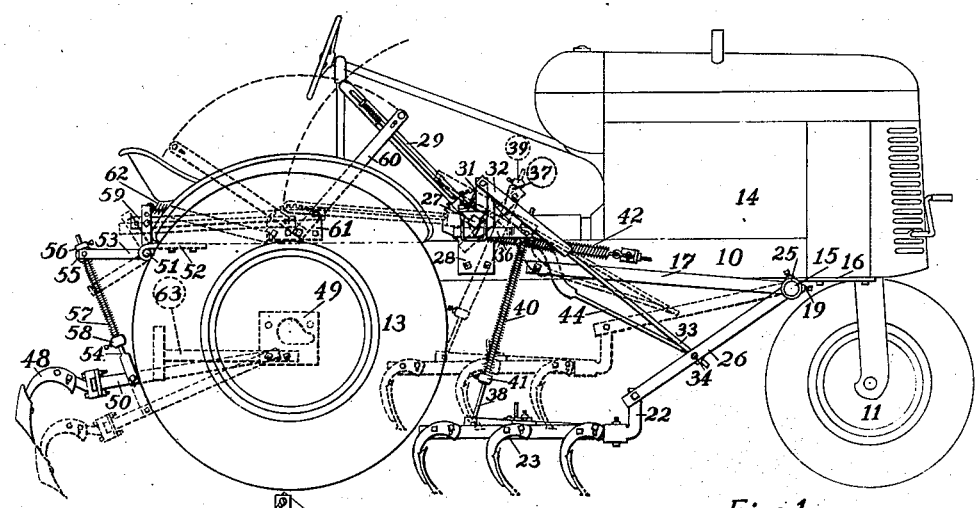
Figure 3:
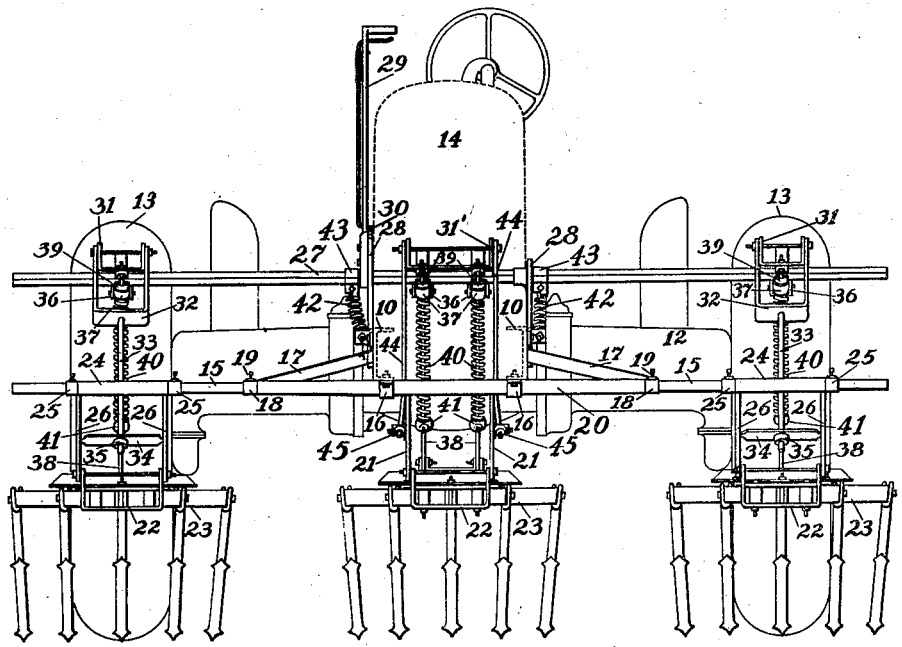
Figure 6:
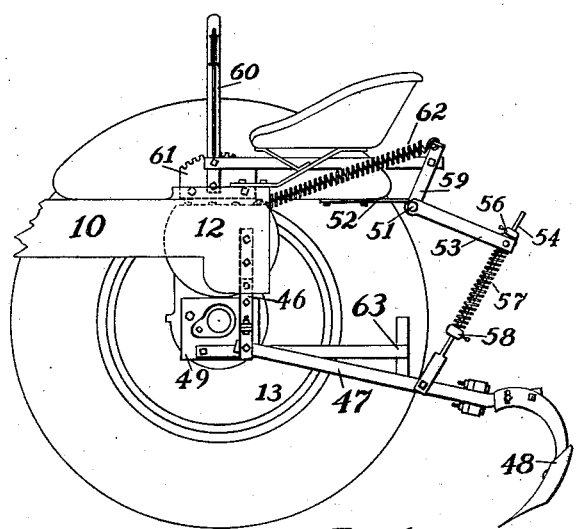
Figure 5:
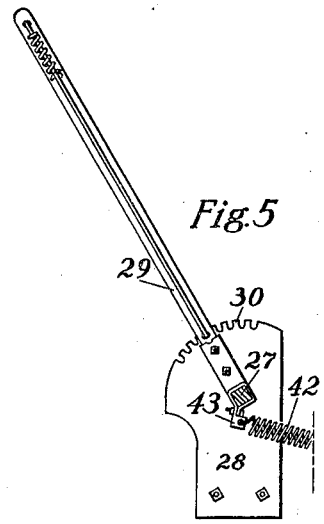

Figure 1 is a side elevation of a conventionally-illustrated, typical tractor wherewith my improvements are shown in operative association, broken lines illustrating alternative positions of the attachments comprised in the invention. Figure 2 is a rear end elevation of the showing of Figure 1, certain of the attachments shown in the latter figure being omitted for clarity. Figure 3 is a front end elevation, on a somewhat enlarged scale, of the showing of Figure 1, certain elements appearing in said latter figure being omitted and certain portions of the tractor unit being omitted or shown in broken lines for better illustration of the invention. Figure 4 is a fragmentary detail view, on an enlarged scale and partly in section, of certain actuating means and connections employed in the invention. Figure 5 is a fragmentary, detail elevation of the lever and attachments utilized in the invention for altitudinal adjustment of the cultivator gangs. Figure 6 is an elevation, partly in section, and on the same scale as Figure 3, illustrating the mounting and operative arrangement of cultivator means carried by the rear portion of the tractor.

In the construction of the improvements as shown, a tractor of conventional type is illustrated as including, in a usual operative combination, a rigid frame assembly 10 supported at its forward end by a steerable wheel 11, an axle assembly 12 transversely of and rigidly secured to the rearward portion of the frame 10, driven wheels 13 supporting the ends of the axle 12, and a power unit enclosed within the housing 14 in driving relation with the wheels 13. The tractor, in itself, forms no part of the instant invention and may vary widely in type and specific construction while still providing an operative mounting for the attachments susceptible of association therewith in accordance with the principles of the invention.

For securing the cultivator gangs to and in position to be drawn forwardly by the tractor, a bar 15, preferably circular in cross section, is disposed transversely of and beneath the forward portion of the frame 10 just rearwardly of the wheel 11 and is secured, as by means of removable clips 16, to the underside of the longitudinal members comprising the tractor frame. The bar 15 is preferably disposed to extend an equal distance on each side of the tractor frame, to lie horizontally in substantially perpendicular relation with the longitudinal axis of the tractor, and may be suitably braced, as by means of arms 17 removably secured at their rearward ends to opposite sides of the frame 10 and diverging outwardly and forwardly therefrom to terminate in sleeves 18 adapted to slidably receive the bar 15 and be clamped thereto by means of set screws, or the like, 19. A relative long tubular sleeve 20 is preferably telescoped over the portion of the bar 15 received between the sleeves 18 and is mounted to rotate relative to said bar within the clips 16, and a pair of arms 21 is fixed to and in spaced relation on the sleeve 20 to extend in parallel relation rearwardly and downwardly from said sleeve to pivotal connection of their rearward ends with the upstanding arms of a yoke 22 fixedly carried by and on the forward end of a cultivator gang 23. The gang 23 is illustrated conventionally and, in its particular structure and conformation, forms no part of the instant invention, it being obvious that cultivator gangs of varying constructions, varying numbers of shovels or blades, and varying types and mountings of such shovels and blades, may be interchangeably associated with the mounting and actuating elements of the invention without in any way altering the construction and operation of the latter.

The arms 21 of the sleeve 20 are preferably so positioned along said sleeve as to dispose the gang 23 connected thereto for travel along a line corresponding with the longitudinal axis of the tractor, and such disposition of the gang 23 may be varied laterally of the apparatus by varying the length of the sleeve 20, or by shortening said sleeve and adjusting its lateral position on the bar 15 by means of clamp collars, tubular spreaders, or the like. However, when a two-row cultivator is desired, it is generally most feasible to position the central cultivator gang midway between the wheels of the tractor, and hence the structure is so illustrated.

The opposite extremities of the bar 15 slidably receive relatively short sleeves 24 telescoped over said bar and positioned therealong by means of clamp collars 25 adapted to be adjustably secured to said bar in bearing engagement against the opposite ends of said sleeves 24, and arms 26 depend in fixed relation with and in spaced parallel relation from the ends of the sleeves 24 for pivotal connection of their rearward ends with yokes 22 carried by the forward ends of additional cultivator gangs 23. The outer gangs 23 secured to the arms 26 may be shifted laterally to vary their spacing relative to the center gang 23 by adjusting the clamp collars 25 along the bar 15 to vary the position of the sleeves 24 on said bar, and thus adapt the cultivator assembly to the spacing and relative position of crop rows. The arms 21 and 26 provide draft means wherethrough forward travel of the tractor is productive of corresponding travel of the cultivator gangs 23 in trailing relation with the bar 15, and the use of two draft arms in connecting relation between the bar 15 and each of the cultivator gangs insures positive maintenance of said gangs in the desired alignment for travel in constant parallelism with the tractor path and without deviation of said gangs laterally from the prescribed path during their travel. The upstanding ends of the yokes 22 to which the arms 21 and 26 attach are provided to negative any lifting effect applied through the draft arms to the forward ends of the gangs 23, the pull exerted by said arms being applied to the cultivator gangs at points well above the plane of the gang frames and in a manner to urge the cultivator shovels of each gang into uniform ground engagement, in spite of the inclined position of the draft arms. The entire cultivator assembly thus far described can conveniently be detached and removed from the tractor by releasing the clips 16 and the rearward ends of the arms 17 from their connection with the tractor frame, thereby freeing the tractor for other uses with or without other specific attachments.

Altitudinal adjustment of the cultivator gangs 23 relative to the tractor frame 10 is accomplished and regulated by means of controls and facilities carried by and operatively associated with a rock-shaft 27 mounted for rotation about its axis transversely of and above the tractor frame 10 in rearwardly-spaced, parallel relation with the bar 15. The rock-shaft 27 is preferably angular in cross section to facilitate attachment thereto of elements adapted to rotate therewith, and is conveniently journaled in bearings carried by plates 28 adapted to be bolted or otherwise removably secured to and in upstanding relation above the opposite sides of the frame 10. An actuating handle 29 is secured at its lower end to the rock-shaft 27 closely adjacent one of the plates 28 and extends within convenient reach of the tractor operator, said handle preferably being provided with a manually-operable pawl for latching engagement with a detent quadrant 30 provided on the upper margin of the associated plate 28, as is customary practice. The handle 29 provides means for selective manual rotation of the rock-shaft 27 in its bearings in the plates 28, and the pawl and detent arrangement associated with said handle and one of the plates 28 provides for latching of said rock-shaft in any one of a number of its rotative positions. Suitably clamped to, above, and somewhat forwardly of the rock-shaft 27, a yoke 31 is disposed vertically above and in alignment longitudinally of the tractor with the median line of each of the outer cultivator gangs 23, said yokes 31 having spaced, parallel, upstanding arms rising above the rock-shaft 27 for pivotal connection with the rearwardly-disposed, free ends of the arms of a yoke 32 which extends forwardly and downwardly from such hinge connection toward the draft arms 26. A pull-rod 33 is fixed to a midportion of the closed forward end of each yoke 32 and extends in alignment with the plane of said yoke to slidable engagement of its free end through a hole formed centrally in a link 34 disposed between and rotatably engaged at its ends with the draft arms 26. A clamp collar 35, or equivalent device, adjustably engages with the free end of the rod 33 in bearing engagement against the forward or under face of the link 34, so that, as the rock-shaft 27 is rotated by means of the handle 29 to swing the arms of the yoke 31 rearwardly of the tractor, tension is applied through the yoke 32 and pull rod 33 to lift the arms 26 about their pivotal connection with the bar 15 and thereby elevate the forward end of the cultivator gang with which said arms are connected, the adjustable character of the collar 35 permitting variation in and regulation of the range of arcuate travel through which said arms 26 may operate under the control of the handle 29. Clamped to and beneath the rock-shaft 27, preferably by the same means utilized in securing and positioning the yoke 31, a bifurcated arm 36 is disposed at substantially right angles with the plane of the yoke 31 and extends forwardly from the rock-shaft 27 between the arms of the yoke 32 and in parallelism with the longitudinal axis of the tractor to hingedly support an apertured line 37 between its forward ends. A pull rod 38 is hinged at its lower end to a rearward central portion of each of the outer cultivator gangs 23 and rises upwardly and forwardly from such connection to slidably engage through the aperture of the link 37, and a clamp collar 39, or equivalent device, adjustably engages with the end of the rod 38 in bearing relation against the upper surface of the link 37 to limit relative travel between said rod and link in one direction. An expansive coil spring 40 surrounds a portion of the rod 38 and engages between the lower surface of the link 37 and a clamp collar 41 adjustably engaging with a lower portion of said rod, so that the expansive force of said spring acts to urge the rod 38 to the limit of its extension, as controlled by the position of the collar 39, downwardly relative to the link 37. The arm 36, rod 38, and associated elements, function during rotation of the rock-shaft 27 in a direction to lift the forward end of said arm 36 to elevate the rearward portions of the gangs 23 with which the rods 38 are connected, and since rotation of the rock-shaft 27 operates to move the yoke 31 and arm 36 simultaneously and in the same direction, the cultivator gangs 23 are elevated out of ground engagement while maintaining their frames substantially horizontal and their shovel or blade element points in a plane substantially parallel with the ground. Naturally, forward movement of the handle 29 actuates the rock-shaft 27 to permit the weight of the cultivator gangs to lower said units into ground engagement, the connection between the arms 26 and the forward end of each cultivator gang operating to positively engage the forward shovels of each gang in and with the ground as the tractor moves forward, while the pressure of the spring 40 urges the rearward portion of the gang into penetration with and through the ground surface, the slidable engagement of the rod 33 through the link 34 and of the rod 38 through the link 37 permitting the cultivator gangs to rise temporarily for accommodation of ground irregularities or to pass over obstructions. To assist in balancing the weight of the gangs 23, retractile coil springs 42 operatively and adjustably engage between lugs 43 depending from and in fixed relation with the rock-shaft 27 adjacent each of the plates 28 and portions of the tractor frame 10 forwardly of said plates, said springs 42 normally being tensioned to facilitate elevation of the gangs.

The elevating mechanism for the central cultivator gang may be identical with that shown and described for the outer gangs, where the construction of the tractor unit will accommodate the elements shown. However, in the case of many tractors, there are tractor elements so disposed along the longitudinal median line of the assembly as to interfere with the installation and use of the elevating assembly above described. In such case, certain modifications of the elevating structure may be had while preserving the principles and functions inherent in such structure. For example, as is clearly shown in Figure 3, a yoke 31', identical with the yoke 31 in its conformation and mounting on the rock-shaft 27 and differing from the yoke 31 only in a somewhat greater length, may be clamped to the central portion of the rock-shaft 27 in hinged connection with the rearward upper ends of a pair of pull rods 44 which extend forwardly and downwardly to slidably engage through brackets 45 fixed to outer sides of the draft arms 21, the forward lower ends of said rods 44 being provided with adjustable clamp collars in bearing relation against said brackets. Where the structure of the tractor requires, the rods 44 may be curved in a vertical plane, in the manner shown in Figure 1, but the function and operation of said rods 44 is essentially the same as that of the yoke 32 and associated rod 33. Similarly, a pair of arms 36 with their associated elements 37, 38, 39, 40 and 41 may be mounted on the rock-shaft 27 in cooperating relation with the yoke 31' to connect with rearward portions of the central cultivator gang 23, which arrangement permits disposition of the rods 38 on opposite sides of tractor structure for elevation of the central cultivator gang in the manner previously described.

The rock-shaft 27 and its associated elements may readily be removed from the tractor by detaching the plates 28 and springs 42 from the tractor frame, disconnection of the linkage between the rock-shaft and the cultivator gangs being all that is required to permit complete removal of the rock-shaft from the tractor. The entire cultivator assembly is thus arranged for convenient attachment to and removal from tractors of varying types, and the simple adjustments provided permit of ready adaptation of the attachment to varying uses with various specific tractors.

Supplementing the cultivator means above described, and of particular advantage in the cultivation of irrigated crops, additional altitudinally-adjustable means are associated with the tractor rearwardly of the gangs 23 and in position for ground engagement behind the wheels 13. As shown in Figures 1 and 2, a yoke 46 is secured to and depends from a midportion of the axle 12, and an arm 47 hingedly connects at its forward end with a central portion of the yoke 46 and extends rearwardly along the longitudinal median line of the tractor to connection with a shovel 48, or analogous cultivating element. Adjacent each end of the axle assembly 12 and inwardly of the wheels 13, suitable plates 49 are fixed to the axle housing for the support of arms 50 hinged thereto for actuation in a vertical arc and extending rearwardly therefrom beyond the wheels 13 for termination in end portions disposed laterally of the tractor to extend outwardly across the path of the wheels 13 for engagement with shovels 48 which may be clamped to and for adjustment laterally of the tractor along the terminal portions of said arms. With the arrangement shown, the shovels 48 may be adjusted in trailing relation with the gangs 23, or to such other specific spacing laterally of the tractor as may be desired, and the shovels 48 may advantageously be of a type to form irrigation troughs or ditches between the crop rows or of a type to further cultivate the soil following the gangs 23 and particularly to loosen the soil packed by the wheels 13.

For regulation and control of the ground penetration and altitudinal adjustment of the shovels 48, a rock-shaft 51 is horizontally disposed transversely of the rear end of the tractor frame 10 and is mounted for rotation about its axis in suitable bearings 52 removably secured to said frame 10. Bifurcated arms 53 are each fixed at one end to the shaft 51 and extend rearwardly therefrom in spaced, parallel relation to align vertically above the arms 47 and 50, and rods 54 hingedly engage at their lower ends with the arms 47 and 50 and extend upwardly and rearwardly from such connection in slidable relation through apertured links 55 swiveled between the forks at the ends of the arms 53, a clamp collar 56 engaging the upper end of each of the rods 54 to adjustably limit separation possible between the arms 47 and 50 and their corresponding arms 53. An expansive coil spring 57 surrounds each of the rods 54 in bearing engagement between the corresponding link 55 and a clamp collar 58 adjustably engaging said rod, so that the expansive force of the spring 57 may act to yieldably hold the arms 47 and 50 at the limit of their separation relative to the corresponding arms 53. For actuation of the rock-shaft 51, an upstanding arm 59 fixed to said shaft 51 is linked to a handle 60 pivotally mounted on a removable plate 61 carried by the tractor adjacent the operator's position, said handle 60 being equipped with a pawl engageable in a detent quadrant on the plate 61 to permit latching of the rock-shaft in any one of its various selected positions. A retractile coil spring 62 preferably engages between the upper end of the arm 59 and a fixed point of the tractor in such a position as will place the spring under tension when the handle 60 is actuated to lower the shovels 48 and thereby utilize said spring to counterbalance a portion of the weight of said shovels and their associated mechanism. Where required, the arms 50 may cooperate with vertical guides 63 disposed rearwardly of and in fixed, supported relation with the plates 49.

For the cultivation of irrigated crops, particularly celery, it is important that the shovels 48 be utilized in conjunction with the cultivator gangs 23, and in any type of crop cultivation better results may be had through simultaneous use through the gangs 23 and elements 48 than will obtain when the latter elements are omitted.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. The combination with a wheel-supported tractor having a frame, a draft bar removably secured transversely and beneath a forward portion of said frame, paired draft arm units hingedly depending from and in laterally-adjustable relation on said bar, and a cultivator gang hinged to and in fixed trailing alignment with each of said draft arm units, of manually-operable means for the simultaneous altitudinal adjustment of said gangs, said means comprising a single rock-shaft carried by and transversely of said frame in rearwardly-spaced parallelism with said draft bar, means for manually oscillating and positioning said shaft, a pair of angularly-related arms fixed to said shaft in substantial alignment with and above each of said gangs, a pull-rod connecting between one of said arms and a rearward portion of its associated gang, and a second pull-rod extending from the other of said arms to connection with the associated draft arm unit forwardly of the hinge engaging said unit with its gang.

2. In apparatus of the character described having a wheel-supported tractor frame, a draft bar removably secured transversely and beneath a forward portion of said frame, paired draft arm units hingedly depending from and in laterally-adjustable relation on said bar, and a cultivator gang hinged to and in fixed trailing alignment with each of said draft arm units, manually-operable means for the simultaneous altitudinal adjustment of said gangs in maintained substantial parallelism with the ground, said means comprising a single rock-shaft independently carried by and transversely of said frame above said gangs, means for manually oscillating and rotatably-positioning said shaft, relatively-shorter upstanding and relatively-longer forwardly extending, perpendicularly-ralted arms fixed to said shaft in substantial alignment with and above each of said gangs, a pull-rod operatively connecting between said longer arm and a rearward portion of the associated gang, and a second pull-rod extending from said shorter arm to operative connection with the corresponding draft arm unit forwardly of the hinge engaging said unit with its gang.

3. In apparatus of the character described having a wheel-supported tractor frame, a draft bar removably secured transversely and beneath a forward portion of said frame, paired draft arm units hingedly depending from and in laterally-adjustable relation on said bar, a cultivator gang hinged to and in fixed trailing alignment with each of said draft arm units, a single rock-shaft independently carried by and transversely of said frame above said gangs, and means for manually oscillating and rotably-positioning said shaft, connections between said rock-shaft, gangs, and draft arm units operable to translate oscillation of the shaft into altitudinal adjustment of said gangs in maintained substantial parallelism with the ground, said connections comprising perpendicularly-related longer and shorter arms adjustably clamped to said rock-shaft in substantial alignment with and above each of said gangs with the shorter of said arms upstanding just forwardly of the said shaft and the longer of the arms projecting forwardly, a link transversely and rotatably bridging between the arms of each draft unit forwardly of the unit connection with its associated gang, a pull-rod operatively connecting between the end of said longer arm and a rear portion of the corresponding gang, and a second pull-rod operatively connecting the end of said shorter arm with a midportion of said link.

4. In a cultivator attachment for removable and replaceable association with a tractor, a draft bar, means for mounting said bar transversely and beneath the forward portion of a tractor frame, draft units, each including a pair of spaced, parallel draft arms, hingedly and shiftably carried by said bar, means for positioning and holding said draft units in adjusted spacing along said bar, a cultivator gang hinged to and in trailing alignment with each of said draft units, a single rock-shaft independently carried by and transversely of said frame above said gangs, and means for manually oscillating and rotatably-positioning said shaft, means and connections between said rock-shaft, gangs, and draft units operable to translate oscillation of the shaft into altitudinal adjustment of said gangs in maintained substantial parallelism with the ground, said means and connections comprising a link transversely and rotatably bridging between the arms of each draft unit forwardly of the unit connection with its associated gang, a yoke upstandingly clamped to, in forwardly-offset relation with, and for adjustment along said shaft above each gang, a pull member hinged to the upper arm ends of said yoke and slidably engaging through a midportion of the corresponding draft unit link, means for adjustably limiting the separation between the yoke and its associated link, an arm clamped to said shaft in association and substantially perpendicular relation with each yoke to extend forwardly from the shaft a distance greater than the projection of the yoke above the shaft, a pull member operatively between the free end of said arm and a rear portion of the corresponding gang, means for adjustably limiting separation possible between each said arm and associated gang, and yieldable means normally urging each gang to the limit of its permissible such separation.

GEORGE W. SWANSON.